United States Patent [19]
Kato

[11] Patent Number: 5,806,367
[45] Date of Patent: Sep. 15, 1998

[54] INTERMITTENT INDEXING APPARATUS USING CAM MECHANISM

[75] Inventor: Heizaburo Kato, Shizuoka, Japan

[73] Assignee: Sankyo Manufacturing Co., Ltd., Tokyo, Japan

[21] Appl. No.: 726,206

[22] Filed: Oct. 4, 1996

[30]     Foreign Application Priority Data

Oct. 24, 1995   [JP]   Japan .................................. 7-275479

[51] Int. Cl.⁶ .............................. F16H 27/04; F16C 23/00
[52] U.S. Cl. .............................. 74/84 R; 74/400; 74/826; 384/519; 384/583
[58] Field of Search .................... 74/84 R, 400, 74/815, 826; 384/519, 583

[56]            References Cited

U.S. PATENT DOCUMENTS

| 2,341,968 | 2/1944  | West ............................................ 74/400 |
| 2,999,311 | 9/1961  | McDonald et al. . |
| 3,525,268 | 8/1970  | Kenny . |
| 3,817,116 | 6/1974  | Georgieff . |
| 3,850,051 | 11/1974 | Woltjen et al. . |
| 4,917,511 | 4/1990  | Katsube ............................. 484/519 X |
| 5,161,904 | 11/1992 | Craft ....................................... 384/519 |

FOREIGN PATENT DOCUMENTS

| 6-207653 | 6/1994 | Japan ..................................... 74/84 R |
| 4-185951 | 7/1992 | Jordan .................................... 74/84 R |

*Primary Examiner*—Rodney H. Bonck
*Assistant Examiner*—Troy Grabow
*Attorney, Agent, or Firm*—Wenderoth, Lind & Ponack, L.L.P.

[57]                ABSTRACT

An intermittent indexing apparatus has a simple structure of supporting portions for bearings without requiring complicated manufacturing processes. The intermittent indexing apparatus includes input shaft, an output shaft, and a housing. An indexing cam is provided on the input shaft and engages cam followers disposed on the peripheral surface of a turret fixed to the output shaft. Opposite ends of the input shaft and the output shaft are rotatably supported by respective first and second pairs of bearings in the housing. First and second openings are formed through opposite side walls of the housing. The second pair of bearings are enabled to slide in an axial direction of the output shaft for positioning. The first opening has a sufficient diameter for introducing therethrough the output shaft with the cam followers. Threaded holes having larger diameters than those of the openings are formed on the outer side portions of the openings so that retainers can be screwed thereinto from the outside of the housing.

6 Claims, 4 Drawing Sheets

INTERMITTENT INDEXING APPARATUS USING CAM MECHANISM

BACKGROUND OF THE INVENTION

1. Field of the Invention

The present invention relates to an intermittent indexing apparatus, and more specifically relates to an intermittent indexing apparatus using a cam mechanism for translating rotation of an input shaft into an intermittent rotation or rotary oscillation of an output shaft.

2. Description of the Related Art

A driving apparatus for generating an intermittent motion is used for such a device as an intermittent driving apparatus for a rotary table of a machine tool. The intermittent driving apparatus may be powered by a mechanical, electrical, pneumatic, or hydraulic motive power unit. Recently, an intermittent indexing apparatus using a cam mechanism has come into wide use due to its significant feature of accurate positioning.

A typical example of a conventional intermittent indexing apparatus is shown in FIGS. 3 and 4. The intermittent indexing apparatus 1 comprises an indexing cam 2a fixed to an input shaft 2 and a plurality of cam followers 3b projectingly disposed on the outer peripheral surface of a turret 3a fixed to an output shaft 3. The cam followers 3b are engaged with a cam ridge portion 2b of the cam 2a. The cam followers 3b trace the cam ridge portion 2b to rotate the turret 3a and the output shaft 3 according to a rotation of the input shaft 2. The rotation of the input shaft 2 is translated into a rotation or oscillation for indexing of the output shaft 3.

The input shaft 2 and the output shaft 3 are rotatably supported by respective pairs of bearings 5, 5a and 6, 6a. The respective pairs of the bearings 5, 5a and 6, 6a are disposed in a housing 4 for supporting opposite ends of the input shaft 2 and the output shaft 3. A taper roller bearing is preferably employed as the bearings 5, 5a, 6 and 6a since it is able to support both a radial and a thrust load. The bearings of each pair 5, 5a and 6, 6a are disposed in opposite directions, because a thrust load of the input shaft 2 or the output shaft 3 in either axial direction can be received by any of the bearings 5, 5a, 6 or 6a.

Each of the outer rings of the bearings 6, 6a for the output shaft 3 are retained by a first output flange 7 and a second output flange 8 disposed in the housing 4. An inner ring of the bearing 6 is opposed to a shoulder portion 3c of the output shaft 3. An inner ring of the bearing 6a is securely fit into the second output flange 8 by a retaining nut 8a screwed into a threaded portion 3d formed at one end portion of the output shaft 3. An opening portion of the second output flange 8 is covered with a blind flange 8b.

A problem with the above conventional intermittent indexing apparatus 1 is that the first and second output flanges 7, 8 have relatively complex structures and shapes for positioning of the bearings 6 and 6a disposed therein, which may require precise and difficult manufacturing processes.

Another problem with the above conventional intermittent indexing apparatus 1 is that an engagement of the indexing cam 2a with the cam followers 3b of the turret 3a has to be adjusted after assembly of the apparatus 1 is completed. For this adjustment, the output shaft 3 is moved in an axial direction and a certain number of shims 9 are inserted between an abutment surface 7a of the first output flange 7 and the housing 4 as required. If a result of the adjustment is not satisfactory, another adjustment is necessary to insert a shim 9 of a different thickness after the flange 7 is removed. The blind flange 8b is also removed to loosen the retaining nut 8a. These conventional assembling and adjusting processes of the indexing apparatus 1 are very time-consuming and require skilled workers.

SUMMARY OF THE INVENTION

An object of the present invention is to provide an intermittent indexing apparatus having a simple structure of supporting portions for bearings.

Another object of the present invention is to provide an intermittent indexing apparatus which is able to be assembled by simple manufacturing processes.

To accomplish these and other objects of the invention, an intermittent indexing apparatus according to one aspect of the present invention includes an input shaft provided with an indexing cam and an output shaft with a plurality of cam followers fixed thereto, the cam followers engaging the indexing cam. A plurality of bearings rotatably support the input and output shafts at respective end portions thereof in a housing. A pair of openings is defined through the opposite side walls of the housing in alignment with each other, each of the openings including an outer portion disposed adjacent to the outer surface of the side wall of the housing and an inner portion disposed in the vicinity of the inside the housing. The inner portions hold the bearings for supporting the output shaft in an axially slidable manner. The inner portion of at least one of the openings has a diameter enabling the output shaft with the cam followers to be introduced into the housing therethrough. Each of the outer portions has a larger diameter than that of the inner portion communicating therewith. A threaded portion is formed on an inner surface of each of the outer portions. A plurality of flange members are screwed into the outer portions in such a manner that fastening and loosening the two flange members enables adjustment of the positions of the bearings disposed in the inner portions.

It is preferable that the input shaft and the output shaft are so positioned to define an orthogonal relationship.

It is also preferable that the bearings are tapered roller bearings.

It is preferable that each pair of the tapered roller bearings for rotatably supporting the input shaft and the output shaft, respectively, comprise two tapered roller bearings disposed oppositely to each other to support thrust loads on each of the input and output shafts applied in axial directions thereof.

It is further preferable that an outer ring of the bearing is supported in the inner portion of the opening in an axially slidable manner and an inner ring of the bearing is fit into a shoulder portion of the output shaft, the shoulder portion being defined by different outer diameters of the output shaft.

The housing preferably comprises a further pair of openings defined through further opposite side walls of the housing in alignment with each other, each of the openings including an outer portion disposed adjacent to the outer surface of the side wall of the housing and an inner portion disposed in the vicinity of the inside the housing, the inner portions holding the bearings for supporting the input shaft in an axially slidable manner. At least one inner portion has a diameter enabling the input shaft with the indexing cam to be introduced into the housing therethrough. Each of the outer portions has a larger diameter than that of the inner portion communicating therewith. A threaded portion is formed on an inner surface of each of the outer portions, and a plurality of flange members are screwed into the outer portions in such a manner that fastening and loosening of each of the flange members enables adjustment of the positions of the bearings disposed in the inner portions.

According to one aspect of an intermittent indexing apparatus of the present invention, the bearings for supporting the output shaft are disposed in the housing in an axially slidable manner and each of the bearings is secured with the respective flange member screwed into the housing from the outside thereof. Therefore, the flange member can be designed to have a simpler structure because it does not have to hold the bearing, therein unlike that of the conventional apparatus. At the same time, the flange member of a simpler structure can be produced by easier manufacturing operations.

Furthermore, the bearings for supporting the output shaft can be moved by loosening and tightening the flange members securing the bearings. Therefore, the axial position of the output shaft can be adjusted without disassembling the apparatus. As a result, engagement of the indexing cam with the cam followers of the output shaft can be adjusted without disassembling the apparatus.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF PREFERRED EMBODIMENT

Figure 1:
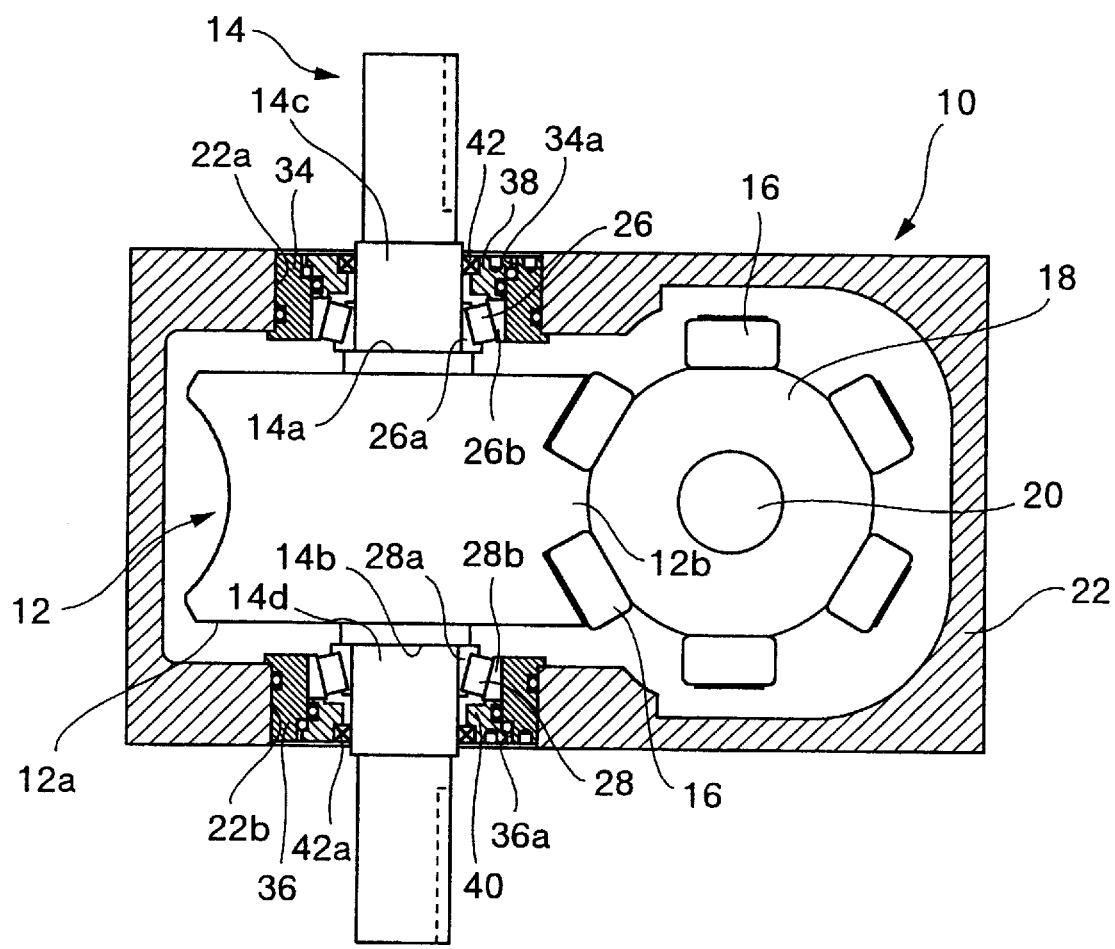
FIG. 1 shows a cross-sectional plan view of an intermittent indexing apparatus according to one embodiment of the present invention, cut away along with an input shaft thereof.
Figure 2:
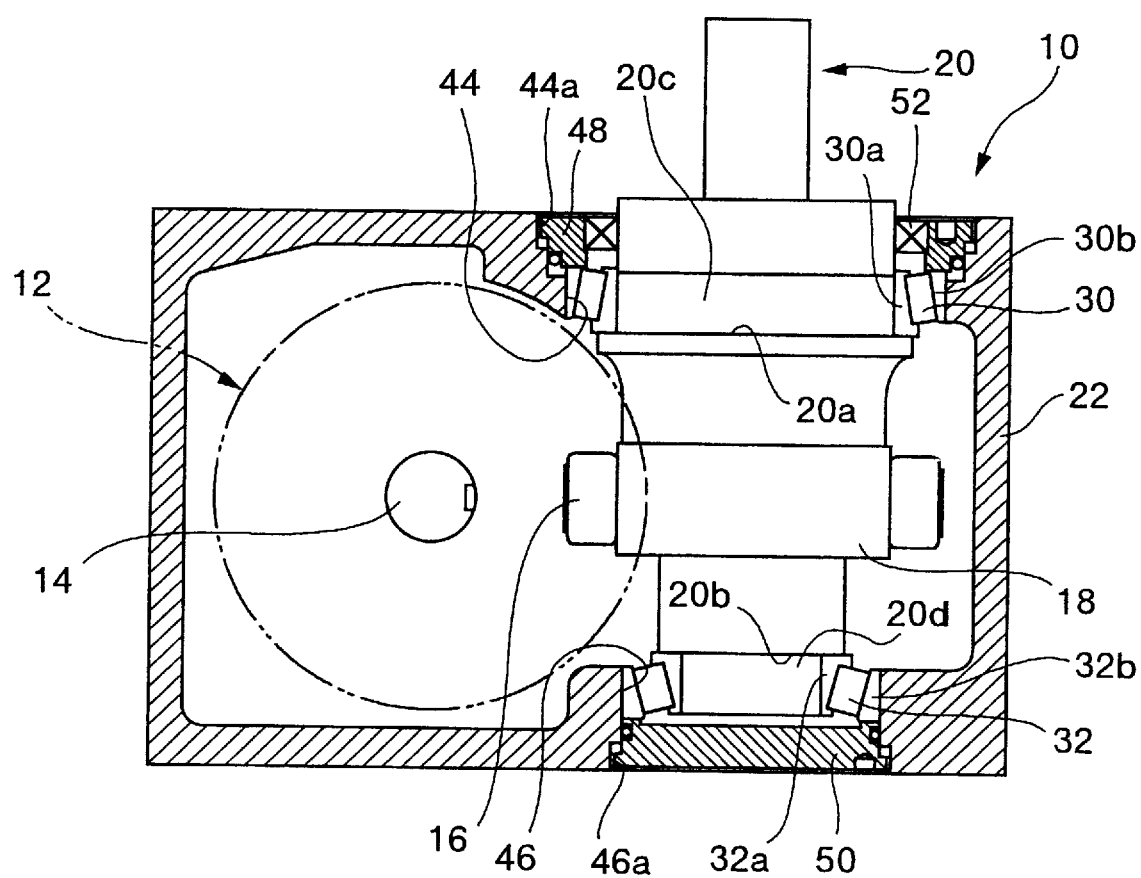
FIG. 2 shows a cross-sectional plan view of an intermittent indexing apparatus according to one embodiment of the present invention, cut away along with an output shaft thereof.
Figure 3:
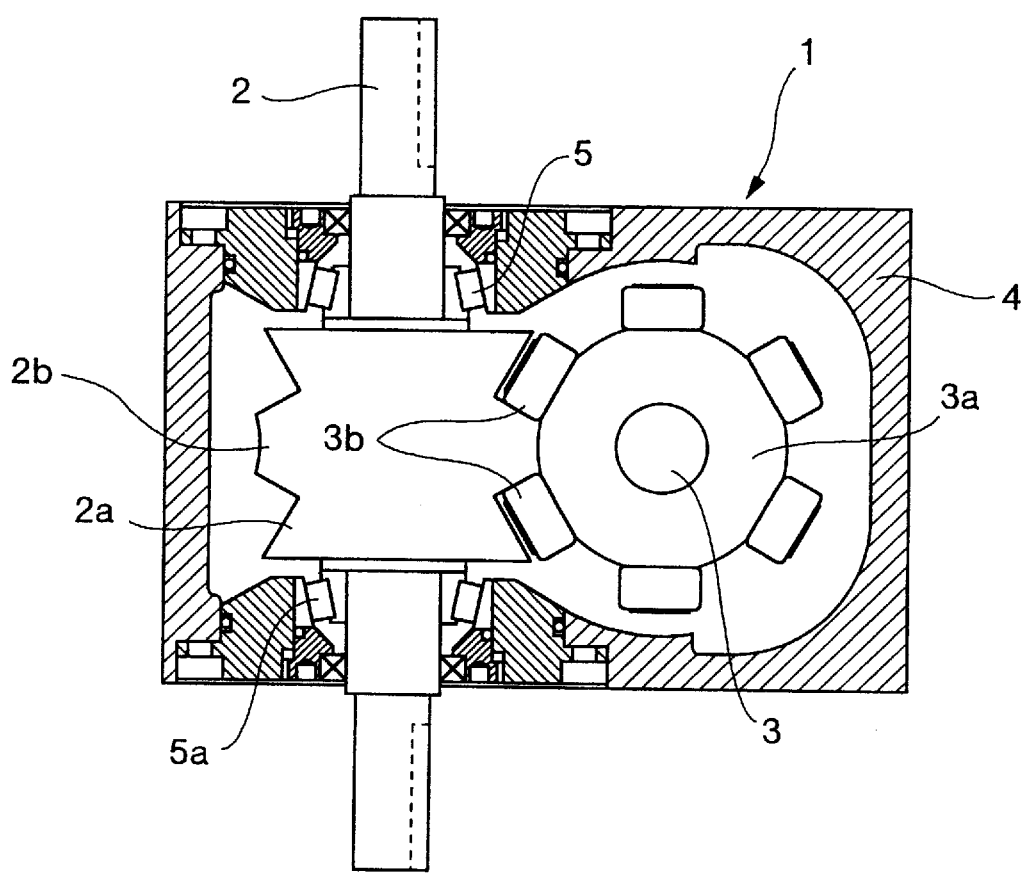
FIG. 3 shows a cross-sectional plan view of an intermittent indexing apparatus according to conventional structure.
Figure 4:
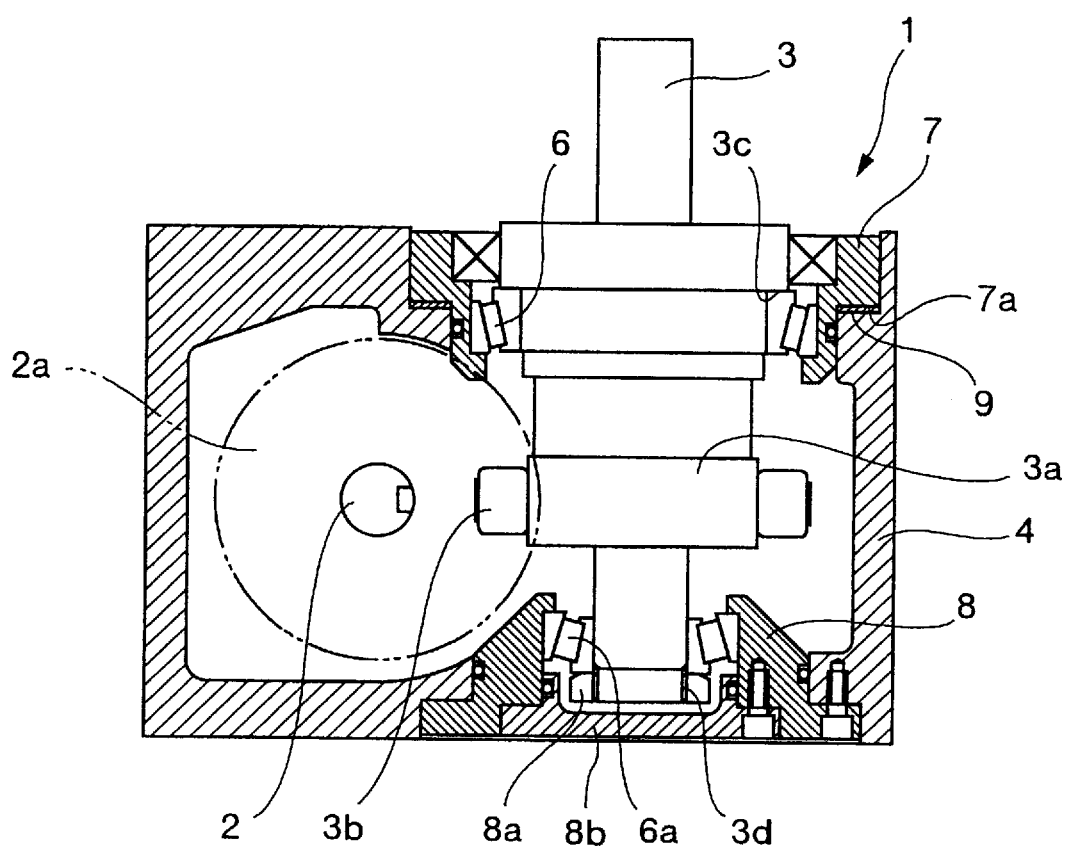
FIG. 4 shows another cross-sectional plan view of an intermittent indexing apparatus according to conventional structure.

As shown in FIGS. 1 and 2, an intermittent indexing apparatus 10 of one embodiment of the present invention comprises an input shaft 14, an output shaft 20, and a housing 22. An indexing cam 12 is provided with the input shaft 14 and engages with cam followers 16 disposed on the peripheral surface of a turret 18 fixed to the output shaft 20. The input shaft 14 having the indexing cam 12 and the output shaft 20 with the turret 18 are installed in the housing 22. Opposite ends of the input shaft 14 and the output shaft 20 are rotatably supported by respective pairs of bearings 26, 28 and 30, 32. A taper roller bearing is suitably employed for the bearings 26, 28, 30 and 32. The bearings 26, 28 and 30, 32 of each pair are disposed in opposite directions, because a thrust load of the input shaft 14 or the output shaft 20 in either axial direction can be received by any of bearings 26, 28, 30 or 32.

The input shaft 14 securely holds the indexing cam 12 at the middle portion thereof. At opposite sides of the indexing cam 12 on the input shaft 14 are disposed respective bearing seating portions 14c and 14d. Shoulder portions 14a and 14b are formed at the bearing seating portions 14c and 14d at inner ends thereof. The bearings 26 and 28 are inserted onto the bearing seating portions 14c and 14d with inner rings 26a, 28a thereof abutted to the shoulder portions 14a and 14b, respectively. The input shaft 14 is disposed in the housing 22 with opposite ends thereof projected through a pair of openings 22a and 22b coaxially formed in the opposite side walls of the housing 22. Flanges 34 and 36 are screwed into the openings 22a and 22b from the 22a and 22b from the inside of the housing 22. The outer rings 26b, 28b of the bearings 26 and 28 are fit into hollow portions of the flanges 34 and 36, respectively. From the outside of the housing 22, retaining rings 38 and 40 are screwed into threaded portions 34a and 36a in the inner peripheral surfaces of the flanges 34 and 36. O-rings 42 and 42a are employed as seals between the input shaft 14 and the retaining rings 38 and 40.

The indexing cam 12 fixed to the input shaft 14 includes a cam ridge portion 12b protrudingly formed on the outer peripheral surface of a drum 12a of the cam 12. The cam ridge portion 12b has a trapezoidal cross section and meanders circumferentially around the peripheral surface of the drum 12a in a predetermined shape. On the side surfaces of the cam ridge portion 12b are slidably pressed a pair of cam followers 16. When the input shaft 14 and the cam 12 disposed thereon are rotated, the cam followers 16 follow the cam ridge portion 12b to rotate or oscillate the turret 18 and the output shaft 20.

Referring to FIG. 2, the output shaft 20 having the turret 18 thereon is supported in the housing 22 in an orthogonal relationship with the input shaft 14 by the bearings 30 and 32. To fix the bearings 30 and 32, a pair of openings 44 and 46, also defining inner portions of the openings, are formed through respective opposite side walls of the housing 22. The bearings 30 and 32 are able to slide in an axial direction of the output shaft 20. In this embodiment, the opening 44 has a sufficient diameter for introducing therethrough the output shaft 20 with the turret 18 and the cam followers 16 into the housing 22. Each of the openings 44 and 46 defines a bearing seating portion on the inner peripheral surface thereof. Threaded holes 44a and 46a are formed in outer portions of the openings 44 and 46 and have a larger diameter than the openings 44, 46, so that retainers 48 and 50 can be screwed thereinto from the outside of the housing 22. The outer rings 30b, 32b of the bearings 30 and 32 are fit into bearing seating portions of the openings 44, 46, respectively.

The output shaft 20 has the turret 18 at the middle portion thereof. The plurality of the cam followers 16 are protrudingly arranged at equal intervals around the peripheral surface of the turret 18. Bearing seating portions 20c and 20d are provided on the output shaft 20 at opposite sides of the turret 18. Shoulder portions 20a and 20b are defined at the boundaries between portions of different diameters on the output shaft 20. The inner rings 30a and 32a of the bearings 30 and 32 are fixedly inserted onto the bearing seating portions 20c and 20d, respectively, of the output shaft 20, so that each of the axial end surfaces of the inner rings 30a, 32a are abutted to the shoulder portions 20a and 20b of the output shaft 20. The retainers 48 and 50 are screwed into the threaded holes 44a, 46a from the outside of the housing 22 and abutted to the outer rings 30a, 32a of the bearings 30, 32. The ring-shaped retainer 48 is screwed into the threaded hole 44a to surround the output shaft 20. The disc-shaped retainer 50 covers or fills the threaded hole 46a. An O-ring 52 seals the gap between the output shaft 20 and the retainer 48.

In the intermittent indexing apparatus 10 according to the present embodiment of the invention, rotation of the input shaft 14 by such a motive power device as an electric motor is translated into oscillation or indexing of the output shaft 20 via engagement of the indexing cam 12 with the cam followers 16.

The outer rings 30b, 32b of the bearings 30, 32 for rotatably supporting the output shaft 20 are disposed in the bearing seating portions of the openings 44 and 46 in an axially slidable manner. Therefore, for example, when the retainer 48 screwed into the threaded hole 44a is loosened and the opposite retainer 50 is tightened as much as the retainer 48 is loosened, the output shaft 20 supported by the bearings 30 and 32 can be moved upwardly as viewed in FIG. 2. On the contrary, when the retainer 50 is loosened and the retainer 48 is tightened, the output shaft 20 is able to be moved in an opposite direction. Using this mechanism of moving the output shaft 20 in an axial direction, the engagement of the cam followers 16 with the indexing cam 12 can be adjusted without disassembling the apparatus 10. As a result, mounting of the bearings 30 and 32 is much easier. At the same time, efficiency of assembly of the intermittent indexing apparatus 10 of the present invention is much improved.

Moreover, since the bearings 30 and 32 are fixed into the openings 44, 46 of the housing 22 and the retainers 48 and 50 are screwed into the threaded holes 44a, 46a to secure the outer rings 30b and 32b of the bearings 30, 32, respectively, the retainers 48, 50 are not required to hold the bearings 30, 32 and can be designed to have simpler shapes than conventional retainers.

It should be noted that the adjustment mechanism of the bearings 30 and 32 of the above embodiment may be applied to the bearings 26 and 28 for supporting the input shaft 14.

While the present invention has been discussed in terms of the preferred embodiment, the present invention can be implemented in various fashions while incorporating modifications of the disclosed embodiment in addition to, omission of or modification of the detailed construction disclosed, without departing from the principle of the invention. Therefore, the present invention should be understood to include all embodiments encompassed within the spirit of the invention set forth in the appended claims.

What is claimed is:

1. An intermittent indexing apparatus comprising a housing, an input shaft having opposite end portions rotatably mounted in said housing by respective bearings and an indexing cam, and an output shaft having opposite end portions rotatably mounted in said housing by respective bearings and cam followers engaging said indexing cam, said apparatus further comprising:

a pair of aligned openings extending through respective opposite side walls of said housing, each said opening having an outer portion adjacent an outer surface of the respective said side wall and an inner portion adjacent to an interior of said housing, said outer portion having a diameter greater than a diameter of said inner portion, said diameter of said inner portion of at least one of said openings being sufficiently large to enable said output shaft and said cam followers to be inserted therethrough into said interior of said housing;

said bearings supporting said end portions of said output shaft fitting into respective said inner portions and being supported therein in an axially slidable manner;

surfaces of said housing defining said outer portions being threaded; and flange members screwed into respective said outer portions, such that fastening or loosening of said flange members causes axial adjustment of the positions of said bearings within said inner portions.

2. An intermittent indexing apparatus as set forth in claim 1, wherein said input shaft and said output shaft are positioned orthogonally relative to each other.

3. An intermittent indexing apparatus as set forth in claim 1, wherein said bearings are tapered roller bearings.

4. An intermittent indexing apparatus as set forth in claim 3, wherein each pair of said tapered roller bearings for rotatably supporting said input shaft and said output shaft respectively comprises two tapered roller bearings oppositely disposed relative to each other to support a thrust load of each of said input and output shafts applied in an axial direction thereof.

5. An intermittent indexing apparatus as set forth in claim 1, wherein an outer ring of each said bearing is supported in the respective said inner portion in an axially slidable manner, and an inner ring of each said bearing is fit into a shoulder portion of said output shaft, said shoulder portion being defined by portions of said output shaft having different diameters.

6. An intermittent indexing apparatus as set forth in claim 1, further comprising:

a pair of aligned additional openings extending through respective additional opposite side wails of said housing, each said additional opening having an outer portion adjacent an outer surface of the respective said additional side wall and an inner portion adjacent to an interior of said housing, said outer portion having a diameter greater than a diameter of said inner portion, said diameter of said inner portion of at least one of said openings being sufficiently large to enable said input shaft and indexing cam to be inserted therethrough into said interior of said housing;

said bearings supporting said end portions of said input shaft fitting into respective said inner portions and being supported therein in an axially slidable manner;

surfaces of said housing defining said outer portions being threaded; and flange members screwed into respective said outer portions, such that fastening or loosening of said flange members causes axial adjustment of the positions of said bearings within said inner portions.

* * * * *